United States Patent [19]

Bernstein et al.

[11] Patent Number: 4,795,898

[45] Date of Patent: Jan. 3, 1989

[54] PERSONAL MEMORY CARD HAVING A CONTACTLESS INTERFACE USING DIFFERENTIAL DATA TRANSFER

[75] Inventors: Howard L. Bernstein, Freehold; Thomas M. Grill, Perth Amboy, both of N.J.; Ronald Silver, Philadelphia, Pa.

[73] Assignees: American Telephone and Telegraph Company, New York, N.Y.; AT&T Bell Laboratories, Murray Hill; AT&T Information Systems Inc., Morristown, both of N.J.

[21] Appl. No.: 856,171

[22] Filed: Apr. 28, 1986

[51] Int. Cl.[4] .................. G06K 7/08; G06K 19/06
[52] U.S. Cl. ........................ 235/487; 235/380; 235/488; 235/492; 235/493
[58] Field of Search ............... 235/492, 487, 488, 493, 235/451, 449, 441, 443, 380; 336/20; 375/36

[56] References Cited

U.S. PATENT DOCUMENTS

| | | | |
|---|---|---|---|
| 3,671,671 | 6/1972 | Watanabe | 375/36 |
| 4,007,355 | 2/1977 | Moreno | 235/492 |
| 4,277,837 | 7/1981 | Stuckert | 235/380 |
| 4,341,927 | 7/1982 | Shinoi et al. | 375/36 |
| 4,385,394 | 5/1983 | Pace | 375/36 |
| 4,473,825 | 9/1984 | Walton | 340/825.54 |
| 4,480,178 | 10/1984 | Miller et al. | 235/380 |
| 4,506,148 | 3/1985 | Berthold et al. | 235/380 |
| 4,605,844 | 8/1986 | Haggan | 235/492 |
| 4,650,981 | 3/1987 | Foletta | 235/380 |
| 4,654,512 | 3/1987 | Gardosi | 235/492 |
| 4,692,604 | 9/1987 | Billings | 336/20 |

FOREIGN PATENT DOCUMENTS

| | | |
|---|---|---|
| 2542792 | 9/1984 | France . |
| 2548803 | 1/1985 | France . |
| 1152833 | 5/1969 | United Kingdom . |
| 2149548 | 6/1985 | United Kingdom . |
| 86/04171 | 7/1986 | World Int. Prop. O. .......... 235/492 |

OTHER PUBLICATIONS

IBM Technical Disclosure Bulletin, "Security Device Power Source", Abramson et al., vol. 17, No. 2, 7/74, pp. 492-493.
J. R. Lineback, "Are EEPROMS Finally Ready to Take Off?", Electronics, vol. 59, No. 7, pp. 40-41, 2-1-7-86.
Scientific American, "Smart Cards", by Robert McIvor, Nov. 1985, pp. 152-159.

Primary Examiner—Raymond F. Cardillo
Assistant Examiner—Robert A. Weinhardt
Attorney, Agent, or Firm—Samuel R. Williamson

[57] ABSTRACT

A personal memory card the size of a standard plastic credit card is usable in a variety of applications, from custom repertory dialing to storage of individual medical and/or banking records. Although the card looks and feels much like an ordinary credit card, the personal memory card includes a computer, an electrically erasable field-programmable read-only memory and also circuitry for inductively receiving a power signal and capacitive transferring data signals between the card and a card reader/writer located in an associated station. No direct ohmic electrical contact is made between the card and the reader/writer for transferring power to the card or for transferring data to and from the card. The card is also reprogrammable by the associated station with new and different data as desired.

19 Claims, 4 Drawing Sheets

PERSONAL MEMORY CARD HAVING A CONTACTLESS INTERFACE USING DIFFERENTIAL DATA TRANSFER

BACKGROUND OF THE INVENTION

This invention relates to smart cards and more particular to a smart card which interacts in a communication or processing system through a contactless interface.

DESCRIPTION OF THE PRIOR ART

The use of credit cards for purchases and for banking and other transactions has become so popular that most travelers today do so with very little cash. The card, typically made of plastic embossed with an account number and the name of the account owner, serves solely to identify an authorized account at a bank or credit house to be charged for a transaction. A magnetic stripe on the back of some cards contains the same information, but is machine-readable to speed the transaction. All accounting information is stored at the bank or credit house.

In that transactions generally occur at a location remote from the bank or credit house, it is easy for a person to use a misappropriated card, or for a legitimate owner to inadvertently exceed his credit limit. Most merchants, therefore, require that before purchases above a relatively modest amount such as $50.00 are completed, the authorization must be verified with the bank or credit house as appropriate. Even with automatic telephone dialing, the procedure is cumbersome and time-consuming. Furthermore, a separate card is needed for each account.

With the advent of recent advances in microelectronics, however, it is now possible to put a vast amount of computing power and memory right in the card to produce a "smart card" or "personal memory card". The card could, therefore, carry personal identification data to virtually eliminate fraudulent use—such data as personal characteristics, driver license, social security number, personal identification numbers, and even a voice print. The card could also carry the account numbers of all of the owner's charge accounts, the balances of all of the accounts, the credit limits of all of the accounts, and other such personal data as, for example, the sizes of family members for clothing purposes, personal telephone directories, etc. The types of personal data are limited only by one's imagination.

The technology for putting all of this on the standard size card is here. What is holding up this very convenient card, however, is what at first appears to be the mundane problem of a suitable interface for supplying operating power to the card and reliably coupling data to and from the card.

Smart cards known in the art are being read and written into by various contact methods. One problem that arises if metallic contacts are used, however, is increased ohmic resistance due to the oxidation that takes place over time on the contact surfaces. This is of concern since the accuracy of the data transfer between a card and a reader or writer device decreases as the ohmic resistance of these contacts increases. In addition, the contacts, while in the exposed position, allow air-borne particles to deposit on the surfaces decreasing the contact area and causing intermittent connections. Inasmuch as operating power for reading and writing into a card is also transferred from an associated station in a system to the card via these contacts, there is a loss in the amount of energy transferred after some time of use, rendering the card inoperative.

A second problem associated with the use of metallic contacts in providing operating power and data onto the smart cards is the possibility of electrostatic discharge (ESD) occurring which can damage the microelectronics on the card. High voltages that build up on a person or card or that are inadvertently coupled thereto from other sources may very easily be coupled directly to the electronics on the card when metallic contacts are used. Clamping diodes employed at the various inputs of a card provide some measure of protection, but are not capable of protecting against some of the higher voltage levels a card might occasionally encounter during normal use in its expected environment.

SUMMARY OF THE INVENTION

In accordance with the invention, a personal memory card typically the size of a standard plastic credit card may be used in a variety of applications, from custom repertory dialing to storage of individual medical and/or banking records. Although the card looks and feels much like an ordinary credit card, the personal memory card includes a computer, an electrically erasable field programmable read-only memory, and also circuitry for receiving a combined power and timing signal and for receiving and transmitting data signals between the card and a reader/writer located in an associated station. No direct ohmic electrical contact is made between the card and the reader/writer for transferring power to the card or data to and from the card. Power to the card and data to and from the card are therefore reliably transferred even after some time of use. In addition, the potential of damage from electrostatic discharges to electronics in the card is minimized since an insulator in the form of a dielectric is provided between the conductors on the card and any sources from which this discharge might occur. The personal memory card is also selectively reprogrammable by an authorized user at the associated station with new and different data as desired.

BRIEF DESCRIPTION OF THE DRAWING

The invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
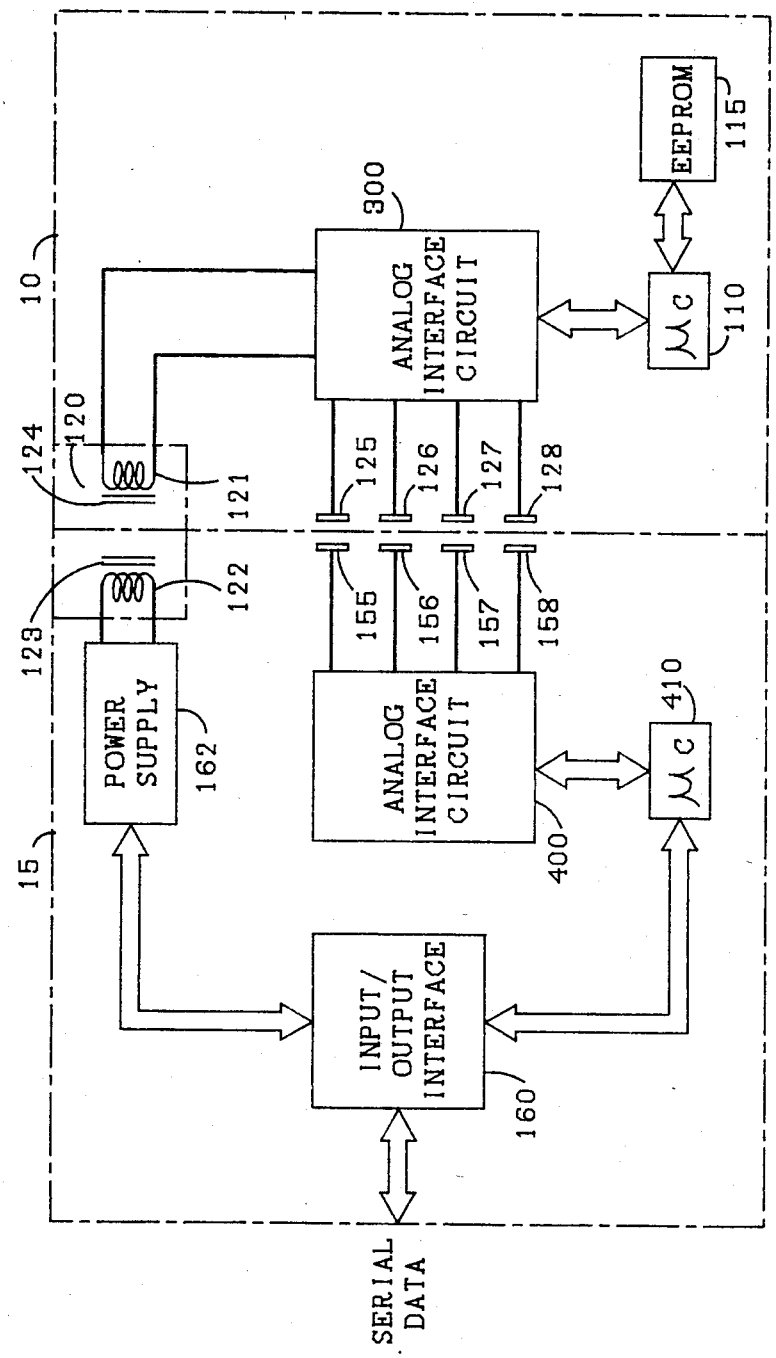
FIG. 1 is a functional block representation of a personal memory card and a reader/writer operative in accordance with the principles of the present invention.

Referring now to FIG. 1, there is shown a block diagram of a portable data or personal memory card 10 being employed with a card reader/writer 15 in accordance with the invention. Some of the principle components located in the card 10 are a microcomputer 110, an electrically erasable programmable read-only memory (EEPROM) 115, an analog interface circuit 300, the secondary winding 121 of a transformer 120, and capacitive plates 125 through 128.

The microcomputer 110 includes a central processing unit and memory units in the form of random-access memory and read-only memory. A microcomputer available from Intel Corporation as Part No. 80C51 may be used for microcomputer 110 with the proper programming. Operating under firmware control provided by its internal read-only memory, the microcomputer 110 formats data to the EEPROM 115 and to the reader/writer 15 via the analog interface circuit 300. The microcomputer 110 also interprets commands from the reader/writer received through the analog interface 300. In addition, the microcomputer 110 checks for errors in reading and writing data to the EEPROM 115 and in transmissions to and from the reader/writer 15.

By employing EEPROM 115 in the card 10, an authorized user has the ability to reprogram certain sections of the card while at an authorized associated application station with new and different data as desired. EEPROMS are available from a number of suppliers, many of whom are mentioned in an article entitled "Are EEPROMS Finally Ready To Take Off?" by J. Robert Lineback, Electronics, Vol. 59, No. 7, (Feb. 17, 1986), pp. 40–41. Data may be written to and read or erased from an EEPROM repeatedly while operating power is being applied. When operating power is removed, any changes made to the data in the EEPROM remain and is retrievable whenever the card 10 is again powered.

The analog interface circuit 300 provides a means for interfacing the memory card 10 to the reader/writer 15. This interface performs a multitude of functions including providing operating power from magnetic energy coupled from the reader/writer 15 to the card 10, and also coupling data between the reader/writer 15 and the microcomputer 110 in the card 10. Power for operating the card 10 is provided to the analog interface circuit 300 via an inductive interface provided by the secondary winding 121 of a transformer 120. This transformer is formed when this secondary winding in the card 10 is mated to a primary winding 122 in the reader/writer 15.

The transformer 120 may advantageously include a ferrite core 123 in the reader/writer for increased coupling between the transformer primary winding 122 and secondary winding 121. A second such core 124 may also be included in the transformer 120 and associated with the secondary winding 121 in the card for a further increase in coupling efficiency. In those arrangements where ample power is available and efficiency is not a consideration, one or both of these cores may be omitted. The use of a transformer for coupling power into a credit card was proposed by R. L. Billings in U.S. Pat. No. 4,692,604, dated Sept. 8, 1987, this patent and this pending application being commonly assigned to the same assignee.

Data reception to and data transmission from the card 10 are provided to the analog interface 300 by a capacitive interface comprising four capacitors formed when electrodes or plates 125 through 128 on the memory card 10 are mated with corresponding electrodes or plates 155 through 158 in the reader/writer 15. Two of these capacitors are used to transfer data to the memory card 10 from the reader/writer 15 and the remaining two are used to transfer data to the reader/writer 15 from the card 10. The combination of the inductive interface and the capacitive interface provides the complete communication interface between the reader/writer 15 and the memory card 10. The analog interface circuit 300 is shown in greater detail in FIG. 3 and further described in the accompanying description later herein.

The organization of some of the components in the reader/writer 15 functionally mirror those in the card. Such components are, for example, an analog interface circuit 400 and a microcomputer 410. In addition, the reader/writer 15 also includes a power supply 162 and an input/output interface 160. The power supply 162 is used to provide power and also to couple a clock signal from the reader/writer 15 to the card 10 through the transformer 120. The input/output interface 160 is principally a universal asynchronous receiver transmitter (UART) and may be advantageously included in the microcomputer 410. The UART is used for externally communicating with a suitably configured application station.

Figure 2:
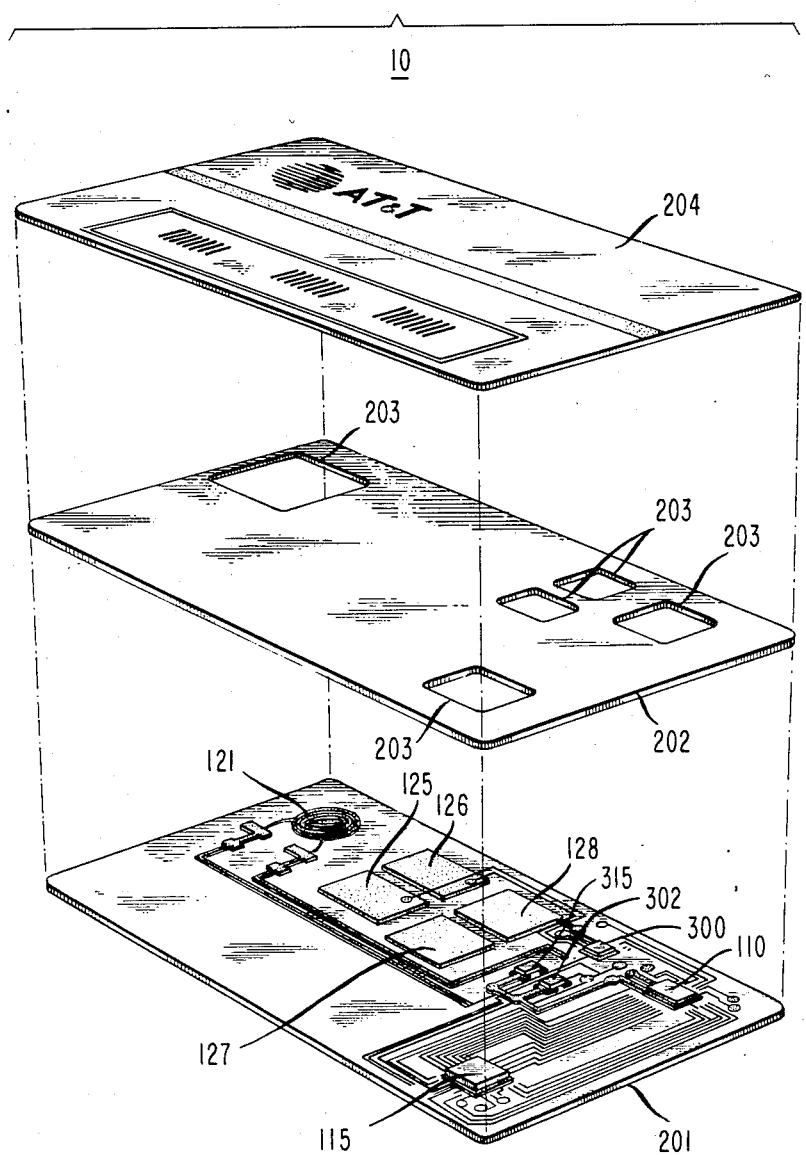
FIG. 2 shows the basic structure of the personal memory card and the placement of the major components thereon in accordance with the principles of the present invention.

With reference to FIG. 2, there is shown the basic structure of the card 10 and the relative placement of the principal components thereon. The card generally comprises a laminated structure including a 0.005 inch thick single or double sided printed wiring board 201. Capacitive plates 125 through 128 are shown deployed on the top side of this printing wiring board, but it is understood that it is well within the capabilities of one skilled in the art to deploy these plates on the bottom or opposite side of the board as long as they are covered by a suitable insulator or dielectric sheet. Pads for bonding the analog interface circuit 300, microcomputer 110, EEPROM 115, transformer secondary 121 and surfacemounted capacitors 302 and 315 are located on the top side of board 201. The integrated circuits, i.e., the microcomputer 110, EEPROM 115 and analog interface circuit 300, are wire bonded and the capacitors are conductively epoxied to the printed wiring board 201. It is to be understood that other means of electrically connecting the integrated circuits to the printed wiring board 201 are known to those skilled in the art. Tape automated bonding is an example of one such means.

In the construction of the card 10, the printed wiring board 201 has laminated to it a structural member 202 which is approximately 0.020 inches thick. This structural member has multiple openings 203 to accommodate the physical size of the above mentioned components which are mounted to the printing wiring board 201. A potting material is subsequently applied in sufficient quantity in the openings 203 of the structural member 202 to cover the components located therein and build up the slightly depressed upper surface of each of these components to align with the topmost surface of the structural member 202.

A top cover sheet 204 is laminated to the structural member 202. To this cover sheet an appropriate label and logos are either affixed thereto or embedded therein. A dielectric sheet is also laminated to the bottom side of the double sided printed wiring board 201 thereby covering up the conductor leads (and possibly conductive plates) located on the lower side of this board that would otherwise be exposed. It is this lower exterior side of the card that generally has instructions and also a magnetic stripe and signature panel as desired.

Figure 3:
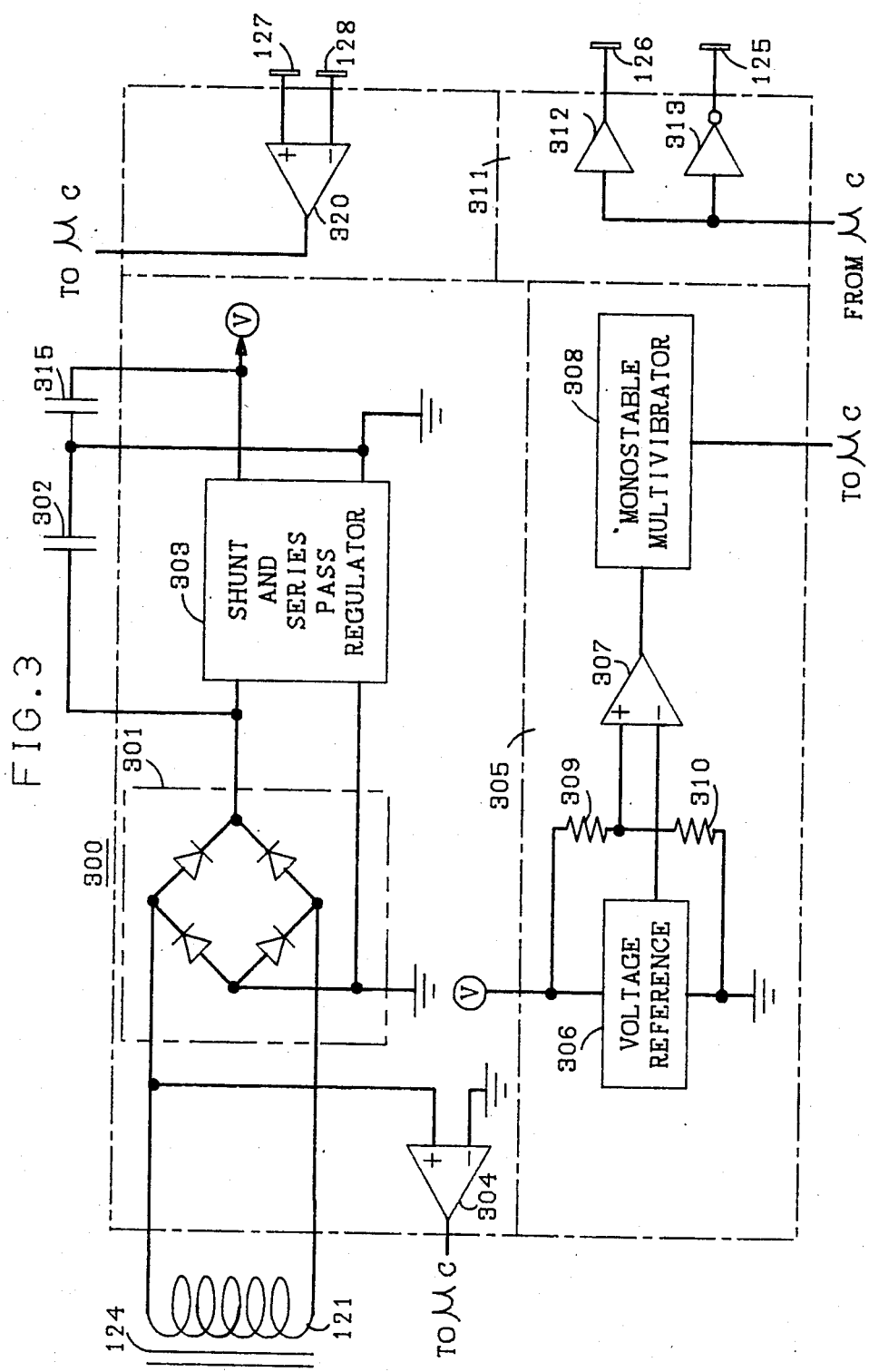
FIG. 3 shows a schematic diagram illustrating in greater detail the major functional components of the analog interface circuit depicted in the memory card of FIG. 1.

Referring next to FIG. 3, there is shown in greater detail the analog interface circuit 300 of FIG. 1. A number of functions for the memory card 10 are provided by this interface circuit, such as power rectification and regulation, transmitting data to and receiving data from the reader/writer 15, obtaining a clock signal from the transformer secondary 121 for operation of the microcomputer 110 and also providing a power reset operation for resetting this microcomputer whenever power is removed and then reapplied to the memory card 10.

Magnetically coupled from the reader/writer 15 through the transformer 120 to the secondary winding 121 is an approximate 1.8 megahertz AC signal. The output of this secondary winding 121 is applied to a full wave bridge rectifier 301. The DC voltage generated by the bridge rectifier 301 is filtered by a capacitor 302 and then coupled into a two-part regulator 303 which has a shunt regulator section on the front end and a series pass regulator on the back end.

The shunt regulator serves to keep the current drawn out of the transformer secondary winding 121 fairly constant and thereby insures operation in an optimal area on the power transfer curve of transformer 120. This is desirable, since if the power demand in the card 10 decreases, the shunt regulator section dissipates the extra power to keep the load constant on the reader/writer 15 and on the transformer secondary winding 121 which is receiving the AC power. And if the power demand goes up in the card because an operation that requires greater power is occurring, the shunt regulator section reduces its power dissipation when it detects the voltage decreasing. The current then passes through the series-pass voltage regulator and provides operating power for all of the other circuitry in the card. Capacitor 315 provides additional filtering to the DC output of the shunt and series pass regulator 303.

A clock recovery circuit 304 is coupled to the secondary winding 121 of the transformer 120 for providing a clock signal suitable for operation of the microcomputer 110. This circuit 304 comprises a comparator which differentially compares one side of the secondary winding 121 of the transformer 120 relative to the ground node of bridge rectifier 301. The pulses that are provided are shaped by the comparator giving relative fast turn-on and turn-off times suitable for driving the microcomputer 110.

A reset circuit 305, comprising a voltage reference 306, a comparator 307 and a monostable multivibrator 308, monitors the regulated output of the shunt and series pass regulator 303. This circuit inhibits the operation of the microcomputer 110 if the supply voltage at the output of the shunt and series pass regulator 303 is not within a predetermined operating range.

A resistor string comprising resistors 309 and 310 form a divider circuit which reduces the voltage coupled to the comparator 307 from the regulator 303. And the voltage reference 306 sets a threshold voltage level corresponding to the minimum allowable of the required operating level which is then compared with the voltage from the resistor string in comparator 307. In operation, as the voltage from the shunt and series-pass regulator 303 rises from zero, the voltage provided to the comparator 307 from the voltage reference 306 is higher than the voltage provided to the comparator from the resistor string and the microcomputer remains reset. When the voltage from the shunt and series-pass regulator 303 rises above the minimum operating voltage, the output of the resistor string becomes higher than the voltage reference. The comparator 307 then switches states and the monostable multivibrator 308 provides a pulse of approximately 200 milliseconds in length to the microcomputer 110 which is enabled thereby and a processor contained therein starts running.

If some time after reaching the required operating level, the regulated voltage happens to dip below the threshold voltage level, the reset circuit 305 detects this decrease and again inhibits the microcomputer 110. This insures against extraneous operations which might occur and in some way affect the data in the EEPROM 115. The reset circuit 305 thus causes the microcomputer 110 to be inhibited whenever the voltage is less than the predetermined operating voltage and guards against improper operation of the card 10 in such low voltage state.

Such an incorrect voltage could occur possibly because the card 10 is not fully seated into the reader/writer 15 or if there is too much of a gap between the surface of the card 10 and the mating surface in the reader/writer 15 because of some obstruction lodged on either surface. And since any interruption of the voltage to the card also causes the reset circuit 305 to be activated, occurrences such as an interruption of AC power to the reader/writer 15, or a user pulling the card 10 out of the reader/writer 15 at an inappropriate time will also cause the microcomputer 110 to be inhibited. Operation of the microcomputer 110 is resumed once the supply voltage returns to the proper operating level.

A data out drive circuit 311, comprising driver amplifiers 312 and 313, receiver serial data from the microcomputer 110 and differentially drive the capacitive plates 125 and 126 which, respectively, interface with the capacitive plates 155 and 156 in the reader/writer 15. These drivers 312 and 313 convert the serial data from the microcomputer 110, which is of one polarity, into a differential polarity such that for each transition of the signal from the microcomputer 110, one of the drivers goes positive, while the other goes negative.

A data receive circuit 320 is comprised of a differential amplifier and is used in receiving differential data coupled to the capacitive plates 127 and 128 from capacitive plates 157 and 158 in the reader/writer 15. This data from the reader/writer 15 is coupled to the microcomputer 110 in the card 10 for the appropriate processing. Hysteresis is built into the data receive circuit 320 such that a differential pulse greater than the hysteresis is all that is required to switch the output of the amplifier from a high state to a low state or from a low state to a high state. The hysteresis aids in preventing noise from causing false triggering of the data receive circuit by ignoring small differential noise signals and switching only on large differential data signals. Thus once the data receive circuit switches states, if there is no further input, it will remain in whatever state it is then switched into and not drift back to the other state.

Although ESD problems are minimized with a contactless card, the addition of protective diodes to clamp the voltage on the outputs of data drive circuits 311 and the inputs of data receive circuit 320 may be designed and included in the card circuitry. The design of such clamping circuits for clamping and also integrating voltages to safe levels is well known and within the capability of those skilled in the art.

Figure 4:
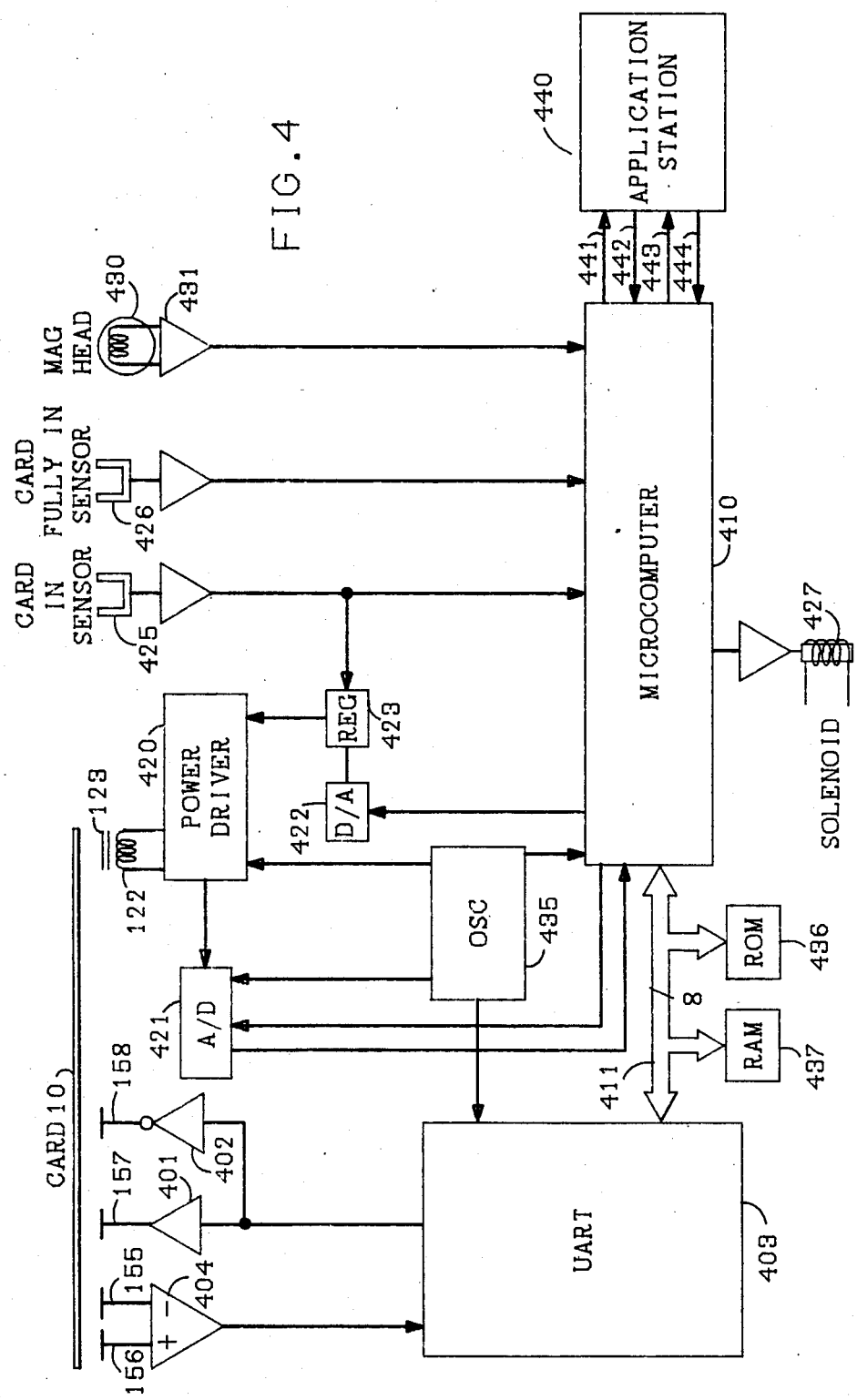
FIG. 4 shows a schematic diagram illustrating in greater detail the major functional components of the reader/writer of FIG. 1.

Referring next to FIG. 4, there is shown a schematic diagram illustrating in greater detail the major functional components of the reader writer 15 shown in FIG. 1. The memory card 10, shown schematically in FIG. 1 and graphically in FIG. 2, is shown in FIG. 4 in operable contact with the data and power couping components of the reader/writer 15. Power to the card is provided from the reader/writer 15 via the primary winding 122 of the transformer 120 formed when the secondary winding 121 in the card 10 is mated to the primary winding 122 in the reader/writer.

As earlier indicated, the transfer of data between the reader/writer 15 and the card 10 is provided by a capacitive interface formed when the plates 125 through 128 on the card are mated with corresponding plates 155 through 158 in the reader/writer 15. The reader/writer 15 has a number of components comparable in operation to those found in the memory card 10. Like the card 10, the reader/writer 15 includes a data-out drive circuit comprising non-inverting driver amplifier 401 and inverting driver amplifier 402. These amplifiers receive serial data from a UART 403 and differentially drive the capacitive plates 157 and 158 which interface with the capacitive plates 127 and 128 in the card 10. Data for the memory card 10 is transmitted to the UART in parallel arrangement over an 8-bit bus 411 from a microcomputer 410.

The reader/writer 15 also includes a data receiver circuit 404 which is comprised of a differential amplifier and is used by the reader/writer 15 in receiving data coupled to the capacitive plates 155 and 156 from the capacitive plates 125 and 126 in the card 10. This serial data from the card 10 is coupled to the UART 403 where it is reformatted into parallel data and then coupled to the microcomputer 410 over the 8-bit data bus 411. The microcomputer 410, through use of an internal UART reconverts the data into a serial format with start and stop bits before coupling the data to a particular application station 440 with which the card 10 and reader/writer 15 are configured to communicate.

The application station may comprise a number of configurations. It may be configured as a factory editing station, an office editing station, an issuer editing station, public telephone station, or any other station suitably configured for interacting with the card 10.

Circuitry for efficiently controlling the transfer of power into the card 10 is advantageously included in the reader/writer 15. A power driver 420 controls the power level that is transmitted into the primary winding 122 of the transformer 120. The power provided to the card 10 via the transformer secondary winding 121 is proportinal to the current in this transformer primary winding 122. The amount of power being provided to the card 10 at any given time by the driver 420 is sampled and the information provided to the analog-to-digital converter 421. This converter provides to the microcomputer 410 a digital signal equivalent of the sampled analog power level. The microcomputer 410, in turn, adjusts the power transfer to the card 10 to the desired level with a signal provided to a digital-to-analog converter 422. The output of this digital-to-analog converter is coupled to a voltage regulator 423 which provides continually corrected drive power for the card 10 into the power driver 420. In this way, power into the card 10 is controlled to within the desired range for proper and efficient operation.

Using a card with the reader/writer 15 requires inserting the card in an accommodating slot in the reader/writer 15. In order to insure proper mating between the card 10 and the interface components within the reader/writer 15 and also to insure correct turn-on of the reader/writer circuitry, proximity sensors are located in the slot in the reader/writer 15. A card-in sensor 425 is located approximately half way in the card slot. This is an optical sensor with illuminating and detecting elements. A mechanical arm is arranged to interrupt an optical beam generated by thei illuminating element and being detected by the detecting element as the card progresses approximately half-way into the slot. This card-in sensor 425 provides a signal to the microcomputer 410 once a card is at the halfway point on its way in or on its way out of the station.

A card fully-in sensor 426 is comparable to the card-in sensor in operation, but is located in the innermost part of the card slot. This sensor informs the microcomputer 410 when the card is fully seated in the card slot.

The reader/writer 15 is conveniently designed to accommodate not only personal memory cards with reprogrammable microelectronics therein, but also cards that have only a magnetic stripe affixed thereto. Once a card is fully seated, a test is performed to determine if the card is a contactless personal memory card or a card having only a magnetic stripe. This test is initiated by having the microcomputer 410 apply power to the power driver 420. If current is drawn from the transformer primary winding 122, the reader/writer 15 assumes a memory card is in the slot. Otherwise, the reader/writer assumes that a magnetic stripe card occupies the slot.

Once the card is fully inserted and if determined to be a memory card based on the current drawn from the transformer primary 122, a solenoid 427 is activated by the microcomputer 410 in order to bring the communication interface in the reader/writer 15 in contact with the inserted card. The capacitive plates 155 through 158 and transformer primary 122 comprising this interface are mounted on a platen for deflectably positioning against the card by this solenoid in order to get the best capacitive and inductive coupling with the card. If the card fully-in sensor 426 is ever tripped because the card is partially pulled out, the solenoid 427 releases immediately so that the card can be easily withdrawn.

If the test for a memory card proves negative, the microcomputer 410 decides that the card just inserted is a magnetic stripe only card. The microcomputer 410 then provides an audible or visual signal to the user to remove the card. As the card is pulled from the slot, data on the magnetic stripe is read by a magnetic head 430, amplified by an amplifier 431 and then coupled into a serial input port on the microcomputer 410.

Included in the reader/writer 15 is an oscillator section 435. This section provides a clock signal for the microcomputer 410 and also provides an approximate 1.8 megahertz signal for the power driver 420. It is this signal that is detected by the clock recovery circuit 304 in FIG. 3 in order to provide a clock signal suitable for operating the microcomputer 110 in FIG. 1.

A clock signal for the data transfer circuitry is also provided by the oscillator section 435 to the UART 403. This signal sets the data transfer rate between the card 10 and the reader/writer 15 at approximately 19.2 kilobits per second. Such a data rate keeps the capacitive plates properly biased during the intervals between data bit transitions and thereby minimizes the susceptibility to noise in the communication interface betwen the card and the reader/writer due to voltage drift.

The microcomputer 410 has additional memory in the form of an external random access memory (RAM) section 437 and an external read only memory (ROM) section 436. For ease of updating or reprogramming, the ROM section may be easily replaced or augmented with an EEPROM section. Such an EEPROM section in the reader/writer 15 and/or in the station 440 is easily reprogrammed by data contained in a card when the card is brought in operable contact with the reader/writer 15.

As earlier indicated, the microcomputer 410 communicates with the outside world via a serial data path to the station 440. This data path includes a transmit lead 441 and a receive lead 442. It also has an attention lead 443 which is activated by the card fully-in sensor 426. Finally, it also includes a reset lead 444 which enables the station 440 to reset the reader/writer 15 and initialize it into a known state. Power to the reader/writer 15 is also supplied by the station 440.

Many other modifications of this memory card are possible and may obviously be implemented by those skilled in the art without departing from the spirit and scope of the invention. An example of such a modification is a memory card operating in a system wherein data is communicated only from the memory card to a card reader. The memory card and/or an associated card reader are configured to have the minimal communication interface and microelectronics necessary to establish and maintain the flow of data from the card to the card reader. It is therefore to be understood that within the scope of the appended claims the invention may be practiced otherwise than as specifically described.

What is claimed is:

1. A portable data card including memory means for storing data and processor means for processing data, the data card comprising:
    input/output means operably connected to the processor means for communicating with at least one reader/writer station, the processor means interpreting commands and processing data from the reader/writer station, the processor means being operably connected to and communicating with the memory means and formatting data for transfer both to the reader/writer station and to the memory means, the input/output means including capacitive coupling means for differentially transferring data from the reader/writer station to the data card and from the data card to the reader/writer station;
    energy coupling means for receiving magnetic energy transmitted from the reader/writer station and for converting the magnetic energy into electric energy for energizing the memory means and the processor means; and
    the capacitive coupling means and the energy coupling means providing in combination a complete communication interface between the data card and the reader/writer station.

2. The portable data card as in claim 1 wherein the capacitive coupling means comprises a series connection between the portable data card and the reader/writer station, the series connection being formed by bringing into alignment in close proximity electrodes in the card and in the reader/writer station.

3. The portable data card as in claim 2 in which at least one of each two electrodes brought into alignment has a dielectric material affixed thereto so that the dielectric material is juxtapositioned between the electrodes.

4. The portable data card as in claim 1 wherein the memory means comprises electrically alterable programmable read-only memory that is modifiable when the data card is brought in operable contact with the reader/writer station.

5. The portable data card as in claim 1 wherein the energy coupling means comprises a flat multiturn coil of electrically conductive material and rectifier means connected to the coil.

6. The portable data card as in claim 1 wherein the input/output means comprises an analog interface circuit for coupling data between the capacitive coupling means and the processor means, the interface circuit including a first and a second amplifier for receiving serial data from the processor means and for differentially coupling this serial data to the capacitive coupling means.

7. The portable data card as in claim 6 wherein the capacitive coupling means comprises a first and a second electrode on the portable data card, the first and second amplifiers respectively being connected to the first and second electrodes for transferring the serial data from the processor means to the reader/writer station.

8. The portable data card as in claim 7 wherein the analog interface circuit further comprises a third amplifier for receiving differential data from the capacitive coupling means and for coupling this differential data to the processor means.

9. The portable data card as in claim 8 wherein the capacitive coupling means further comprises a third and a fourth electrode on the portable data card, the third amplifier being connected to both the third and fourth electrodes for transferring the differential data from the reader/writer station to the processor means.

10. The portable data card as in claim 9 wherein the analog interface circuit further includes timing means connected to the energy coupling means for deriving timing pulses related to the frequency of the transmitted magnetic energy for timing data transfer between the memory means and the processor means and between the data card and the reader/writer station.

11. The portable data card as in claim 10 wherein the processor means comprises a microcomputer.

12. A portable data card including memory means for storing data and processor means for processing data, the data card comprising:
    means operably connected to the processor means for communicating with at least one reader station, the processor means interpreting commands and processing data from the reader station, the processor means being operably connected to and communicating with the memory means and formatting data for transfer both to the reader station and to the memory means the communicating means including capacitive coupling means for differentially transferring data from the data card to the reader station;
    energy coupling means for receiving magnetic energy transmitted from the reader station and for converting the magnetic energy into electric energy for energizing the memory means and the processor means; and the capacitive coupling means and the energy coupling means providing in combination a complete communication interface between the data card and the reader station.

13. The portable data card as in claim 12 wherein the capacitive coupling means comprises a series connection between the portable data card and the reader station, the series connection being formed by bringing into alignment in close proximity electrodes of the card and of the reader station.

14. The portable data card as in claim 13 in which at least one of each two electrodes brought into alignment has a dielectric material affixed thereto so that the dielectric material is juxtapositioned between the electrodes.

15. The portable data card as in claim 12 wherein the energy coupling means comprises a flat multiturn coil of electrically conductive material and rectifier means connected to the coil.

16. The portable data card as in claim 12 wherein the communicating means includes an analog interface circuit for coupling data from the processor means to the capacitive coupling means, the analog interface circuit including a first and a second amplifier for receiving serial data from the processor means and for differentially coupling this serial data to the capacitive coupling means.

17. The portable data card as in claim 16 wherein the capacitive coupling means comprises a first and a second electrode on the portable data card, the first and second amplifiers respectively being connected to the first and second electrodes for transferring the serial data from the processor means to the reader station.

18. The portable data card as in claim 17 wherein the analog interface circuit further includes timing means connected to the energy coupling means for deriving timing pulses related to the frequency of the transmitted magnetic energy for timing data transfer between the memory means and the processor means and from the data card to the reader station.

19. The portable data card as in claim 18 wherein the processor means comprises a microcomputer.

* * * * *